(12) United States Patent
Wagener

(10) Patent No.: US 7,244,143 B2
(45) Date of Patent: Jul. 17, 2007

(54) BUSBAR SYSTEM AND CONNECTING OR APPLIANCE ADAPTER

(75) Inventor: Hans Wagener, Dietzholztal (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 10/525,552

(22) PCT Filed: Jan. 5, 2004

(86) PCT No.: PCT/EP2004/000014

§ 371 (c)(1),
(2), (4) Date: Feb. 24, 2005

(87) PCT Pub. No.: WO2004/064214

PCT Pub. Date: Jul. 29, 2004

(65) Prior Publication Data

US 2006/0035517 A1    Feb. 16, 2006

(30) Foreign Application Priority Data

Jan. 11, 2003    (DE) ................................ 103 00 723

(51) Int. Cl.
*H01R 13/60* (2006.01)
(52) U.S. Cl. ...................................... 439/532; 439/76.2
(58) Field of Classification Search ................ 439/532, 439/212, 110–118, 121, 122, 681, 949, 207, 439/718, 76.2; 174/149 B, 70 B, 68.2, 88 B, 174/99 B, 72 B; 361/775, 361, 355, 358
See application file for complete search history.

(56) References Cited

U.S. PATENT DOCUMENTS

| | | | | |
|---|---|---|---|---|
| 4,916,574 A | * | 4/1990 | Hancock et al. ............ 361/649 |
| 5,442,135 A | * | 8/1995 | Faulkner et al. ........... 174/68.2 |
| 5,938,461 A | * | 8/1999 | Biermeier et al. .......... 439/212 |
| 6,672,889 B2 | * | 1/2004 | Biermeier et al. .......... 439/212 |

FOREIGN PATENT DOCUMENTS

| | | |
|---|---|---|
| DE | 93 06 013.0 U1 | 5/1994 |
| DE | 197 14 839 C1 | 4/1998 |
| DE | 197 44 827 A1 | 4/1999 |
| EP | 0 926 790 A3 | 6/1999 |
| EP | 0 926 791 A3 | 6/1999 |
| EP | 1 094 579 A1 | 4/2001 |

* cited by examiner

*Primary Examiner*—Truc T. Nguyen
*Assistant Examiner*—Edwin A. Leon
(74) *Attorney, Agent, or Firm*—Pauley Petersen Erickson

(57) ABSTRACT

A busbar system having an assembly unit for receiving a pluralilty of conductor busbars in electrically insulating busbar supports, and at least one connecting or appliance adapter which includes a receiving bridge for receiving terminals or appliances, and is embodied to electrically connect the same to the conductor busbars. The system of this invention has a simple structure, favoring the operation of the system because the assembly unit includes holding sections located on lateral, parallel longitudinal edge sections, and at least one adapter has a first fixing section and a second fixing section on the two narrow end sections thereof, and the fixing sections are adapted to the associated edge sections and have holding elements which co-operate with the holding sections for fixing the adapter.

15 Claims, 2 Drawing Sheets

BUSBAR SYSTEM AND CONNECTING OR APPLIANCE ADAPTER

BACKGROUND OF THE INVENTION

1. Field of the Invention

This invention relates to a busbar system, having a mounting unit for receiving several busbars in electrically insulating busbar holders, and at least one connecting or device adapter, which has a receiving bridge for receiving terminals or devices, and has the electrical connection of the same with the busbars, and relates as well to a device adapter for use in such a busbar system.

2. Discussion of Related Art

A busbar system, or such a device adapter, is taught by European Patent Reference EP 0 926 790 A3, for example. Hook elements of this known busbar system and device adapter which, for producing a dependable mechanical and electrical connection, have spring-loaded elements, and which can be suspended from the respective busbars, are arranged on an underside of the adapter facing the busbar. A relatively elaborate cost outlay is connected with this, and the manipulation of the device adapters during attaching and releasing them can cause difficulties, particularly if the device adapters have devices connected to them.

Other device adapters are taught by European Patent Reference EP 0 926 791 A3 and German Patent Reference DE 93 06 013 U1.

SUMMARY OF THE INVENTION

One object of this invention is to provide a busbar system, as well as a device adapter, of the type mentioned above but which has a simplified construction and simpler handling.

This object is achieved with a busbar system having a mounting unit with holding segments along lateral longitudinal edge sections, which extend parallel with each other. On two oppositely located end sections the at least one adapter has a first and a second fastening section, which are matched to the edge sections to which they are or can be assigned, and have holding elements which work together with the holding segments for fixing the adapter in place.

With these measures, the mechanical fastening of the adapter at the mounting unit and its electrical connection to the busbars are separated from each other, wherein the mechanical connection, as well as the electrical connection, are better functionally matched to the respective requirements, and the construction and manipulations are simplified. In this case stable mounting is also assured because of the mechanical fastening at the two end sections.

In connection with the device adapter for use in a busbar system having a receiving bridge, on whose top facing away from the busbar to be contacted, devices to be electrically connected with the busbars can be arranged, and on whose underside contact elements for providing an electrical contact with associated busbars are arranged. A first and a second fastening section, which have holding elements for securing the adapter on a mounting unit outside of the area of contact sections of the contact elements, are on the underside of the two narrow end elements of the adapter.

These steps also result in a separation of the mechanical fastening and the electrical connection, as well as the above mentioned advantages in construction and manipulation.

In one embodiment for the construction and manipulation it is advantageous for the edge sections to have strips, which protrude from a mounting plane and on whose protruding end sections the holding segments are formed.

Also, the steps wherein the holding segments are embodied as laterally outwardly angled holding structures and/or have rows of fastening receivers, form a stable, simple attachment and release of the device adapter.

Also, the steps, wherein the mounting unit is embodied in cross section is a shallow U-shaped trough with a base section, on which the lateral edge sections are formed and angled off, or attached as separate angular profiled sections. The busbars can be fixed in place in the trough by busbar holders, which are arranged transversely with respect to the mounting unit, and contribute to an advantageous construction and simple, flexible mounting.

The construction and manipulation of the device adapter are advantageous because a first one of the holding elements is embodied as a hook element, which can be adjusted against an opposing spring force for releasing the adapter. A second one of the holding elements is embodied as a hook element, which is fixedly connected with the associate fastening section.

For a dependable electrical connection, along with a simple operation, several contact elements, which extend in the longitudinal direction of the adapter, are seated in the underside of the insulating receiving bridge which faces the mounting unit, and by which an electrical contact with the associated busbars is provided and a connection with a connection section, which is formed in at least one end section of the adapter, is made. Thus a dependable electrical contact is aided because the contact elements are springy and/or are charged with a spring force so that a contact pressure is created with a contact section of the contact elements on the outside of the associated busbars facing away from the mounting unit.

A simple rugged attachment of devices is possible because a coupling device for attaching devices to be received is provided on the top of the receiving bridge facing away from the mounting unit, which can be electrically connected by connecting lines via connecting receivers in the top of the end section of the adapter.

In one embodiment for the manipulation and construction of the adapter, the holding elements are embodied as hook elements, at least one of which is adjustably seated.

There is improved protection against accidental contact of the user with a simplified construction and simplified manipulation, because the device adapters, possibly also with the devices connected with them, can be mounted and released in a simple and unequivocal manner. It is also possible to simply attach covers for the busbars at the holding segments of the mounting unit between the device adapters, wherein the covers have holding elements which correspond to those of the adapters.

BRIEF DESCRIPTION OF THE DRAWINGS

This invention is explained in view of exemplary embodiments, making reference to the drawings, wherein.

DESCRIPTION OF PREFERRED EMBODIMENTS

Figure 1:
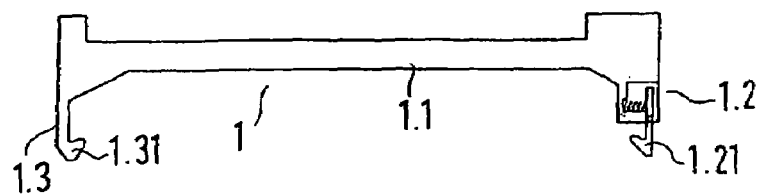
FIG. 1 is a lateral view of a mounting unit with attached busbars and a device adapter to be placed on it.
Figure 1:
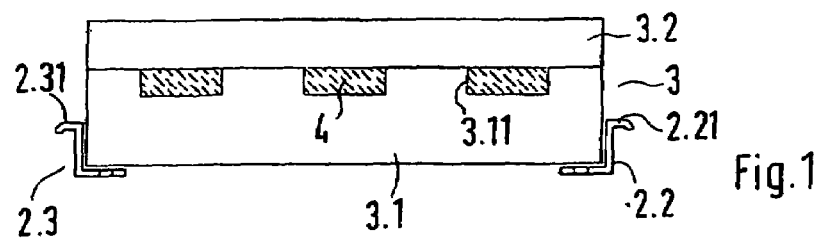

An exemplary embodiment of a busbar system represented in FIG. 1 shows a mounting unit 2, on which several busbars 4 are arranged by busbar holders 3 attached thereto, and with which a device adapter 1, which is brought into contact with the busbars 4, is connected. The attached state of the adapter 1 is shown in FIGS. 2 and 3.

The mounting unit 2 has two lateral profiled sections in the shape of edge sections 2.2, 2.3, which are angled away in a Z-shape, wherein a center section of the edge sections 2.2, 2.3 projects away vertically out of a mounting plane. The two end sections are oriented parallel with the mounting plane and are thus at right angles with respect to the center section. The end sections of the first and second edge sections 2.2, 2.3 facing the mounting plane face each other, while the end sections facing away from the mounting plane are embodied as the first and second holding section 2.21, 2.31 and point outward away from each other. In addition, for improving the holding effect, the two holding segments 2.21, 2.31 have short holding protrusions, which are oriented downward toward the mounting plane. As represented in FIG. 3, it is possible to provide holding receivers 2.22 in the holding sections 2.2, 2.3, which advantageously also can have a customary grid spacing.

Figure 2:
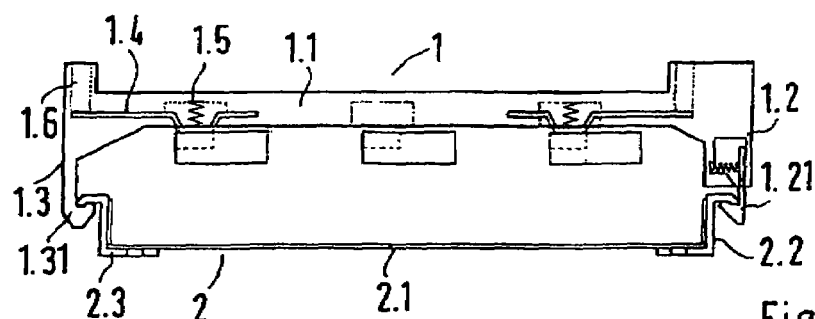
FIG. 2 shows a representation of the parts shown in FIG. 1 with the device adapter attached.
Figure 3:
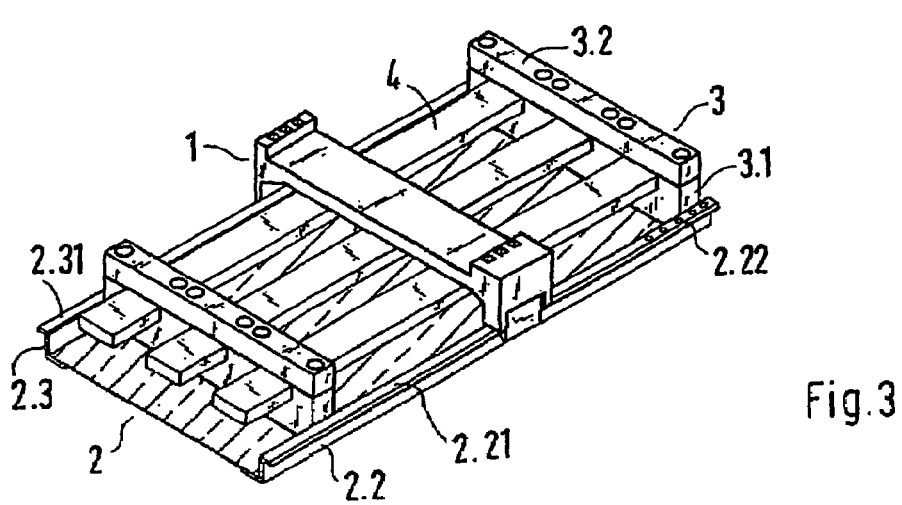
FIG. 3 shows a perspective plan view of the busbar system in FIG. 2.

For forming the mounting unit 2, the profiled edge sections 2.2,2.3 can be applied directly to a mounting plane, in particular a mounting board or, as shown in FIGS. 2 and 3, they can be connected with each other by their own, preferably plate-like base sections 2.1. In this case the edge sections 2.2. 2.3 can be attached as separate elements to the base section 2.1, or can formed as one piece on the base section 2.1. If an insulation of the mounting unit 2 is desired, the base section 2.1 and/or the edge sections 2.2, 2.3 can be made of an insulating material or coated with an insulating layer. In cross section, the mounting unit 2 is embodied as a shallow U-shaped through, for example its width is greater by a multiple, for example more than three times or four times, its height.

The busbar holders 3 are attached in the mounting plane 2 between the center sections of the edge sections 2.2, 2.3 transversely to the longitudinal extension of the mounting unit 2 and are attached, for example, to the base section 2.1 and/or the center section of the edge sections 2.2, 2.3 by an appropriate fastener. The busbars 4 are seated on the top of the busbar holders facing away from the base section 2.1, in a lower section 3.1 of the same, and are rigidly fixed in place by a top section 3.2, which is screwed or snapped on.

Figure 4:
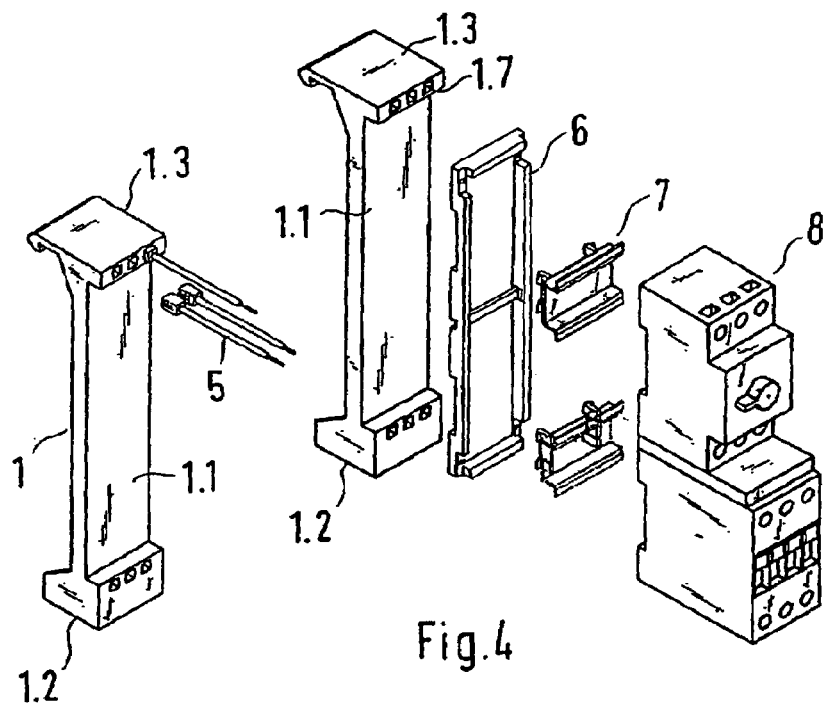
FIG. 4 shows a perspective view of a device adapter with devices to be attached by a coupling element in a released arrangement.
Figure 5:
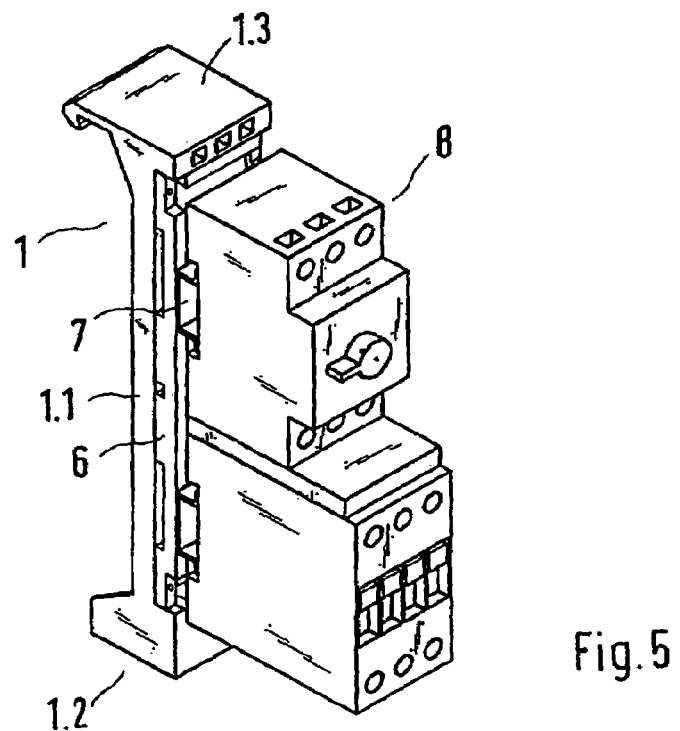
FIG. 5 shows a perspective view of the components shown in FIG. 4, in an assembled form.

The adapter 1, also represented in FIGS. 4 and 5, which is substantially rectangular in a view from above, has lateral fastening sections 1.2, 1.3 with hook-like holding elements 1.21, 1.31 arranged on an underside, in the area of or near its narrow end sections of both its sides. Connecting receivers 1.7 for the electrical connection with devices 8 to be received are provided in upwardly pointing protrusions on the top of the fastening sections 1.2, 1.3, which are attached to a receiving bridge 1.1 connecting the two end sections, by connecting means, for example a plate-like coupling element 6 and/or top hat rail-like coupling elements 7, as shown in FIGS. 4 and 5. The electrical connection of the devices 8 with electrical contacts in the connecting receivers 1.7 is provided via connecting lines 5.

For connecting the adapter 1 mechanically with the mounting unit 2, the hook-shaped holding elements 1.21, 1.31 are suspended from the associated holding segments 2.21,2.31 of the mounting unit 1, as shown in FIG. 2. The holding elements 1.21, 1.31 of the adapter have holding protrusions, which are facing each other at the distance of the holding segments 2.21, 2.31 and which, in the mounted state of the adapter 1, extend behind the holding segments 2.21, 2.31, wherein a defined holding tension is formed. Fixation in place of the adapter 1 takes place by a sort of snap-on process, for which purpose the first hook-shaped holding element 1.21 is pivotably or shiftably seated and is under the pre-tension of a spring. Thus the hook element can be outwardly deflected against the spring force and is maintained in the holding position by the spring force. The second holding element 1.31 is fixedly connected with the end section, or the fastening section 1.3, preferably formed on it. Thus, the second holding element 1.31 of the adapter 1 can first be suspended in a simple way from the corresponding holding section 2.31, and can thereafter be fixed in place on the first holding section 2.21 by the first holding element 1.21 snapping-in with a sort of pivot movement, wherein the first holding element 1.21 is deflected outward via an inclined run-up element arranged on the first holding element 1.21. For releasing, the first holding element 1.21 can be moved outward manually against the spring force in a simple manner.

Alternatively to the described and represented embodiment of the fastening sections 1.2, 1.3 with the holding elements 1.21, 1.31, a screw connection or differently designed snap-in connection with suitable snap-in elements and counter-snap-in elements is possible.

For providing the electrical contact of the adapter 1 and the device 8 connected with it with the busbars 4, multiple contact strip-like contact elements 1.4, which are insulated against each other, are embedded in the underside of the receiving bridge 1.1 and have both contact sections for contact with the top of the associated busbars 4 and make a transition to the connecting receiver 1.7 by a connecting section 1.6. The contact element 1.4 is additionally charged with the spring force from a pressure spring 1.5 in the area of or near the contact section, for example, for aiding the electrical contact. Connecting sections 1.6 can be formed in both, or only one of the two end sections of the adapter 1, the contact elements 1.4 are accordingly connected with the connecting sections 1.6. With the elastic seating of the contact elements 1.4, an assured contact is also achieved if the tops of the busbars 4 do not lie exactly on one level. It is possible to assure by the contact pressure that the adapter 1 is fixed in place, free of play, on the holding segments 2.21, 2.31. But fixation in place free of play can also be assured by supporting the underside of the bridge on the top of the busbars 4, so that the adapter 1 has a certain amount of elasticity, in particular in the receiving bridge 1.1. In another embodiment a stable, free-of-play connection of the adapter 1 with the mounting unit 2, along with an assured contact with the contact elements 1.4, can for example be provided by support elements on the top of the mounting unit 2, wherein the fixation in place takes place by appropriate snap-in elements extending below the holding section, or by screw connections. In all cases, the manipulation while attaching and removing the adapter 1 is simple, wherein electrical contact always takes place dependably during the execution of the mechanical fastening.

In areas in which the busbars 4 are not covered by adapters 1, cover elements can be attached to the holding sections 2.21, 2.31 of the mounting unit 2 with corresponding holding elements 1.21, 1.31, or similar holding elements, such as the adapters 1.

The invention claimed is:

1. A busbar system, having a mounting unit (2) for receiving busbars (4), and at least one device adapter (1) which has a receiving bridge (1.1) for receiving one of terminals and devices (8), and is embodied for electrical connection with the busbars, wherein the mounting unit (2) embodied in cross section as a shallow U-shaped trough with a base section (2.1) has holding segments (2.21, 2.31) along lateral longitudinal edge sections (2.2, 2.3), which extend parallel with each other, and on two oppositely located end sections the at least one adapter (1) has a first and a second fastening section (1.2, 1.3) matched to the edge sections (2.2, 2.3) to which they are assignable and have holding elements (1.21, 1.31) which work together with the holding segments (2.21, 2.31) for fixing the adapter (1) in place, the busbar system comprising:

for fixing the busbars (4) in place in the mounting unit (2) electrically insulating busbar holders (3) are arranged transversely with respect to the busbars (4) in a trough, and the busbars (4) seated on a top of the busbar holder (3) facing away from the base section (2.1) in a lower part (3.1) of the holder, and are fixed in place by one of a screwed top and a snapped on top (3.2).

2. The busbar system in accordance with claim 1, wherein the lateral edge sections (2.2, 2.3) are one of angled off and attached as separate angular profiled sections to the base section.

3. The busbar system in accordance with claim 1, wherein a first of the holding elements (1.11) is embodied as a hook element which can be adjusted against an opposing spring force for releasing the adapter (1), and a second of the holding elements (1.21) is embodied as a hook element, which is fixedly connected with the associate fastening section (1.3).

4. The busbar system in accordance with claim 1, wherein a plurality of contact elements (1.4) which extend in a longitudinal direction of the adapter (1) are seated in an underside of the insulating receiving bridge (1.1) which faces the mounting unit (2) by which an electrical contact with the associated busbars (4) is provided and a connection with a connection section (1.6) is formed in at least one end section of the adapter (1).

5. The busbar system in accordance with claim 1, wherein the contact elements (1.4) are at least one of springy and charged with a spring force so that a contact pressure is created with a contact section of the contact elements (1.4) on an outside of the associated busbars (4) facing away from the mounting unit (2).

6. The busbar system in accordance with claim 1, wherein a coupling device (6, 7) for attaching devices (8) to be received is on the top of the receiving bridge (1.1) facing away from the mounting unit (2), which can be electrically connected by connecting lines (5) via connecting receivers (1.7) in the top of the end section of the adapter (8).

7. The busbar system in accordance with claim 1, wherein the edge sections (2.2, 2.3) have strips which protrude from a mounting plane and on whose protruding end sections the holding segments (2.21, 2.31) are formed.

8. The busbar system in accordance with claim 7, wherein the holding segments (2.21, 2.31) are at least one of laterally outwardly angled holding structures and have rows of fastening receivers (2.22).

9. The busbar system in accordance with claim 8, wherein the lateral edge sections (2.2, 2.3) are one of angled off and attached as separate angular profiled sections to the base section.

10. The busbar system in accordance with claim 9, wherein a first of the holding elements (1.11) is embodied as a hook element which can be adjusted against an opposing spring force for releasing the adapter (1), and a second of the holding elements (1.21) is embodied as a hook element, which is fixedly connected with the associate fastening section (1.3).

11. The busbar system in accordance with claim 10, wherein a plurality of contact elements (1.4) which extend in a longitudinal direction of the adapter (1) are seated in an underside of the insulating receiving bridge (1.1) which faces the mounting unit (2) by which an electrical contact with the associated busbars (4) is provided and a connection with a connection section (1.6) is formed in at least one end section of the adapter (1).

12. The busbar system in accordance with claim 11, wherein the contact elements (1.4) are at least one of springy and charged with a spring force so that a contact pressure is created with a contact section of the contact elements (1.4) on an outside of the associated busbars (4) facing away from the mounting unit (2).

13. The busbar system in accordance with claim 12, wherein a coupling device (6, 7) for attaching devices (8) to be received is on the top of the receiving bridge (1.1) facing away from the mounting unit (2), which can be electrically connected by connecting lines (5) via connecting receivers (1.7) in the top of the end section of the adapter (8).

14. The busbar system in accordance with claim 1, for use with the device adapter (1) having a receiving bridge (1.1) with a top facing away from the busbar (4) to be contacted devices (8) to be electrically connected with the busbars (4) can be arranged, and on an underside contact elements (1.4) for providing an electrical contact with associated busbars (4) are arranged, wherein a first and a second fastening section (1.2, 1.3) are provided with holding elements (1.21, 1.23) for securing the adapter (1) on a mounting unit (2) outside of an area of contact sections of the contact elements (1.4), and are embodied on the underside of the two narrow end elements of the adapter (1).

15. The adapter in accordance with claim 14, wherein the holding elements (1.21, 1.31) are hook elements, and at least one of the hook elements is adjustably seated.

* * * * *